United States Patent
Mai

(10) Patent No.: US 6,871,979 B2
(45) Date of Patent: Mar. 29, 2005

(54) BACK LIGHT MODULE

(75) Inventor: Che-Kuei Mai, Hsin-Chu (TW)

(73) Assignee: Toppoly Optoelectronics Corp., Miao-Li Hsien (TW)

( * ) Notice: Subject to any disclaimer, the term of this patent is extended or adjusted under 35 U.S.C. 154(b) by 31 days.

(21) Appl. No.: 10/249,755

(22) Filed: May 6, 2003

(65) Prior Publication Data

US 2004/0076006 A1 Apr. 22, 2004

(30) Foreign Application Priority Data

Oct. 21, 2002 (TW) ................................ 091124268 A

(51) Int. Cl.$^7$ ............................ F21V 1/00; F21V 11/00
(52) U.S. Cl. ................. 362/241; 362/560; 362/561; 362/243; 362/245; 362/247; 362/260; 362/297; 362/328; 362/330; 362/341; 362/373; 362/240
(58) Field of Search .................... 362/240, 29, 241, 362/560, 559, 561, 243, 245, 247, 260, 296, 297, 328, 330, 341, 373

(56) References Cited

U.S. PATENT DOCUMENTS 5,143,433 A * 9/1992 Farrell ...................... 362/29
6,089,739 A * 7/2000 Yamamoto et al. ......... 362/561

FOREIGN PATENT DOCUMENTS

JP 04288527 A * 10/1992 ......... G02F/1/1335

* cited by examiner

Primary Examiner—Stephen Husar
Assistant Examiner—Sharon Payne
(74) Attorney, Agent, or Firm—Winston Hsu

(57) ABSTRACT

A back light module disposed under a display panel has at least a light source generator for generating light beams, a diffusing plate for scattering the light beams to the display panel, a light guide plate (LGP) for scattering the light beams to the diffusing plate, a reflecting sheet for scattering the light beams to the light guide plate. The reflecting sheet has at least an opening for dissipating heat generated by the operation of the light source generator of the back light module.

19 Claims, 6 Drawing Sheets

BACK LIGHT MODULE

BACKGROUND OF THE INVENTION

1. Field of the Invention

The present invention relates to back light module, and more specifically, to a back light module with an improved heat transfer rate.

2. Description of the Prior Art

Backlight units are known in the art. The backlight unit, which is a key element in the fabrication of liquid crystal displays, is widely used in digital cameras, PDAs, vehicle satellite navigation systems, computer monitors, flat panel TVs and so on. Typically, a backlight unit, which is generally installed underneath a display panel, comprises a light source (or multiple light sources) and a light diffusion means for providing users and consumers with diffused, ample, and comfortable backlighting. Light penetrates the overlying display panel and forms various images controlled by pixel electrodes densely arranged on the display panel. Backlight units are typically divided into two major categories: edge light type and direct-type, wherein the direct-type backlight unit can provide higher intensity of light and is thus more suited for large size display panels, such as display panels or TV panels, than the edge light type.

Please refer to FIG. 1 of a cross-sectional view of a back light module 10 according to the prior art. As shown in FIG. 1, the back light module 10 is disposed under a display panel 12 and comprises at least one light source generator 14, a diffusing plate 16 disposed between the light source generator 14 and the display panel 12, a light guide plate (LGP) 18 disposed between the light source generator 14 and the diffusing plate 16, and a reflecting sheet 20 disposed under the light source generator 14 and fixed on a housing 22. The light source generator 14 is employed to generate a light source, and the reflecting sheet 20 is employed to upwardly reflect the light source generated by the light source generator 14 and thereby increase the light use efficiency of the back light module 10. The light guide plate 18 is employed for scattering the light source to the diffusing plate 16, and the diffusing plate 16 is employed for further scattering the light source to the display panel 12. The housing disposed under the reflecting sheet 20 is utilized to assemble the diffusing plate 16, light guide plate 18, reflecting sheet 20 and light source generator 14. In addition, the diffusing plate 16 further comprises at least one prism 24 disposed on a surface of the diffusing plate 16 to reduce the difference of the luminous intensities on the display panel 12 in advance. The quantity and placing order of the prism 24 employed are defined by the specification of the back light module 10.

However, in most cases, the light source generator 14 is composed of a cold cathode fluorescent lamp (CCFL), and the cold cathode fluorescent lamps are paralleled arranged in a small chamber inside the back light module 10. As a result, the heat generated during the operation of the back light module 10 can be entirely dissipated to the air outside the back light module 10 and is therefore accumulated inside the back light module 10, leading to an abnormal high temperature of the light source generator 14, which eventually causes malfunctions and reduces the product lives of components related to the back light module 10.

SUMMARY OF INVENTION

It is therefore a primary object of the present invention to provide a back light module with improved heat transfer rate.

According to the claimed invention, the back light module is disposed under a display panel and comprises at least one light source generator, a diffusing plate, a prism, a light guide plate (LGP) and a reflecting sheet. The light source generator is employed to generate a light source, and the diffusing plate is disposed between the light source generator and the display panel to scatter the light source to the display panel. The prism is disposed on a surface of the diffusing plate, and the light guide plate is disposed between the light source generator and the diffusing plate to scatter the light source generated by the light source generator to the diffusing plate. The reflecting sheet is disposed under the light source generator to reflect the light source to the light guide plate, and comprises at least one opening for dissipating heat generated by the light source generator.

It is an advantage of the present invention against the prior art that a surface of the reflecting sheet of the back light module comprises the opening and a plurality of vent holes, and the reflecting sheet comprises at least one arc-shaped structure to increase both the reflecting rate and the heat-dissipation area of the reflecting sheet. The heat generated during the operation of the backlight module can be dissipated to the air outside the back light module, and the heat transfer rate of the back light module is therefore improved significantly. Consequently, malfunctions caused by an abnormal temperature of the light source generator are prevented, and product lives of either the back light module or other relative components are increased as well.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
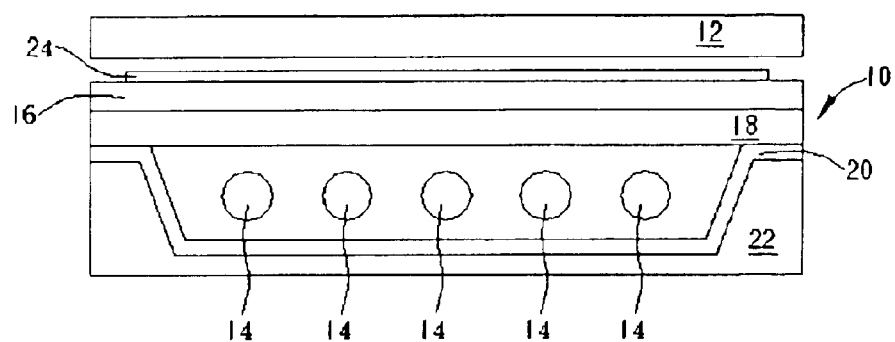
FIG. 1 is a cross-sectional view of a back light module according to the prior art.
Figure 2:
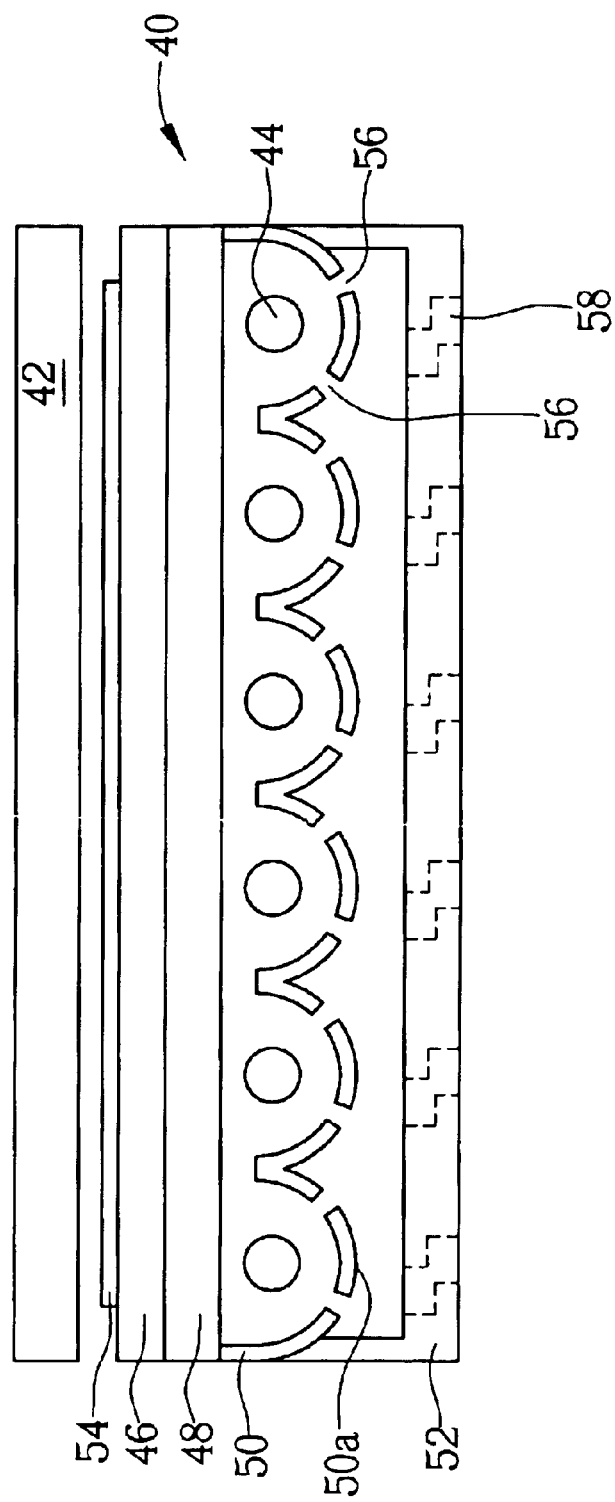
FIG. 2 is the cross-sectional view of a back light module according to the first embodiment of the present invention.

Please refer to FIG. 2 of a cross-sectional view of a back light module 40 according to the first embodiment of the present invention. As shown in FIG. 2, the back light module 40 is disposed under a display panel 42 and comprises at least one light source generator 44, a diffusing plate 46 disposed between the light source generator 44 and the display panel 42, a light guide plate (LGP) 48 disposed between the light source generator 44 and the diffusing plate 46, a reflecting sheet 50 disposed under the light source generator 44, and a housing 52 that surrounds the reflecting sheet 50 and comprises a plurality of first vent holes 58.

Normally, the light source generator 44 is a lamp for generating a light source. In the preferred embodiment of the present invention, the light source generator 44 is a cold cathode fluorescent lamp (CCFL), and the cold cathode fluorescent lamps are arranged in parallel. The reflecting sheet 50 is composed of either aluminum (Al) or an alloy, and is employed to reflect the light source generated by the light source generator 44 to the light guide plate 48. Alternatively, the reflecting sheet 50 is composed of a stacked film, comprising an upper sheet composed of either a metal sheet or other materials having a high light transmission ratio and a bottom sheet composed of either foamed polyethylene terephthalate (foamed PET) or polycarbonate (PC). As shown in FIG. 2, the reflecting sheet 50 comprises at least one arc-shaped structure 50a to increase both the reflecting rate and the heat-dissipation area of the reflecting sheet 50, and a surface of the reflecting sheet 50 comprises at least one opening 56 disposed directly under the light source generator 44. The light guide plate 48 is employed for scattering the light source generated by the light source generator 44 to the diffusing plate 46, and the diffusing plate 46 is employed for further scattering the light source to the display panel 42. In addition, the diffusing plate 46 comprises at least one prism 54 disposed on a surface of the diffusing plate 46 to adjust the brightness of the light source generated by the light source generator 44 to reduce the difference of the luminous intensities on the display panel 42 in advance. The quantity and placing order of the prism 54 employed are defined by the specification of the back light module 40.

Figure 3:
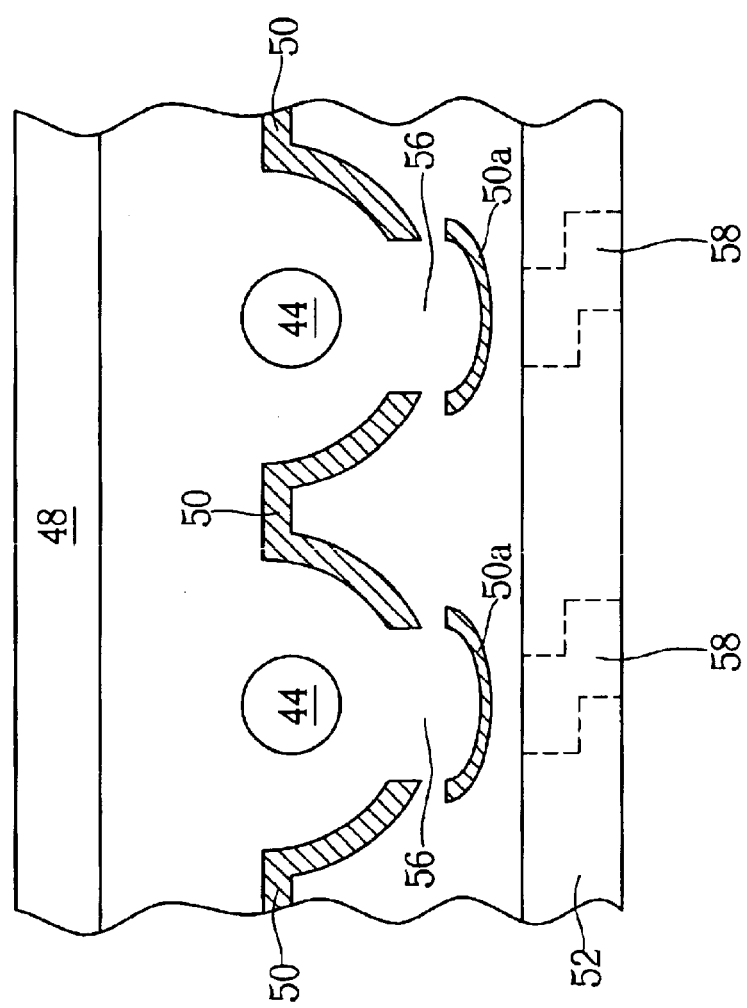
FIG. 3 is an enlarged cross-sectional view of another embodiment of the reflecting sheet 50 in FIG. 2.
Figure 4:
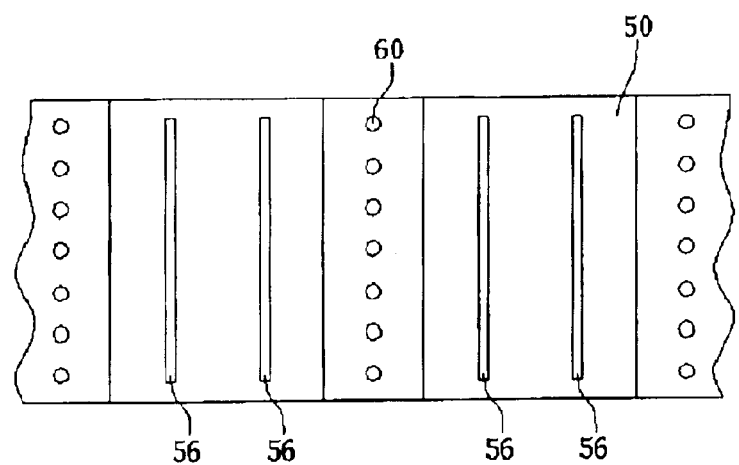
FIG. 4 is a top view of the reflecting sheet 50 in FIG. 2.

Please refer to FIG. 3 and FIG. 4, which are respectively an enlarged cross-sectional view and a top view of the reflecting sheet 50. As shown in FIG. 3 and FIG. 4, the opening 56 has a slot shape corresponding to the shape of the light source generator 44, and is employed for dissipating the heat generated by the light source generator 44 during the operation of the back light module 40. In addition, the reflecting sheet 50 further comprises a plurality of second vent holes 60. Therefore, the heat generated by the light source generator 44 during the operation of the back light module 40 can be convectively dissipated to the air outside the back light module 40 via the opening 56 and the second vent hole 60 of the reflecting sheet 50, and the first vent hole 58 of the housing 52. Especially, as shown in FIG. 3, the arc-shaped structure 50a, which can be formed by removing a part of the reflecting sheet 50 from the reflecting sheet 50 for forming the opening 56, is positioned at a different level from the reflecting sheet 50, such that the opening has a large space to enhance the heat dissipation. The arc-shaped structure 50a preferably has a shape that is the same as the opening 56 and a size substantially not less than the size of the opening 56 for light reflection efficiency.

Figure 5:
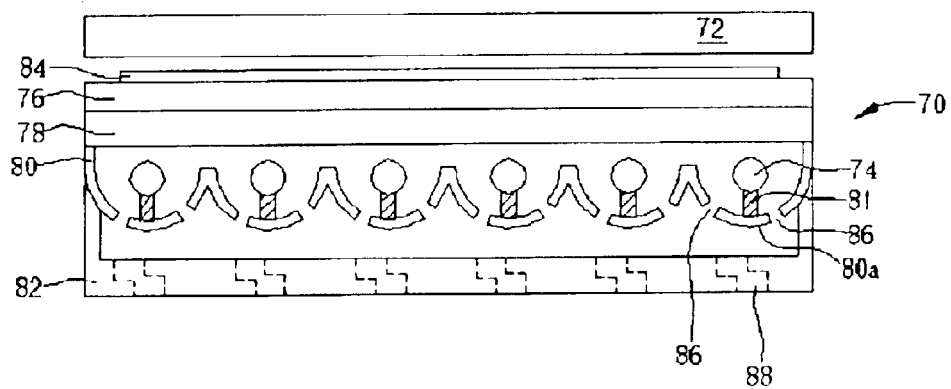
FIG. 5 is the cross-sectional view of a back light module according to the second embodiment of the present invention.

Please refer to FIG. 5 of the cross-sectional view of a back light module 70 according to the second embodiment of the present invention. As shown in FIG. 5, the back light module 70 is disposed under a display panel 72 and comprises at least one light source generator 74, a diffusing plate 76 disposed between the light source generator 74 and the display panel 72, at least one prism 84 disposed on the surface of the diffusing plate 76, a light guide plate 78 disposed between the light source generator 74 and the diffusing plate 76, a reflecting sheet 80 disposed under the light source generator 74, and a housing 82 that surrounds the reflecting sheet 80 and comprises a plurality of first vent holes 88. Same as the first embodiment of the present invention, the reflecting sheet 80 comprises at least one arc-shaped structure 80a to increase both the reflecting rate and the heat-dissipation area of the reflecting sheet 80, and a surface of the reflecting sheet 80 comprises at least one opening 86, disposed directly under the light source generator 74, and a plurality of second vent holes (not shown) for assisting the heat dissipation of the back light module 70 during operation. However, the back light module 70 differs from the back light module 40 in the first embodiment of the present invention that the back light module 70 further comprises at least one column 81 disposed between the light source generator 74 and the reflecting sheet 80. The composition, structures and functions of the light source generator 74, diffusing plate 76, light guide plate 78, reflecting sheet 80, housing 82, prism 84, opening 86, first vent hole 88 and the second vent hole are same as those of the light source generator 44, diffusing plate 46, light guide plate 48, reflecting sheet 50, housing 52, prism 54, opening 56, first vent hole 58 and second vent hole 60 and are eliminated for simplicity of description.

Figure 6:
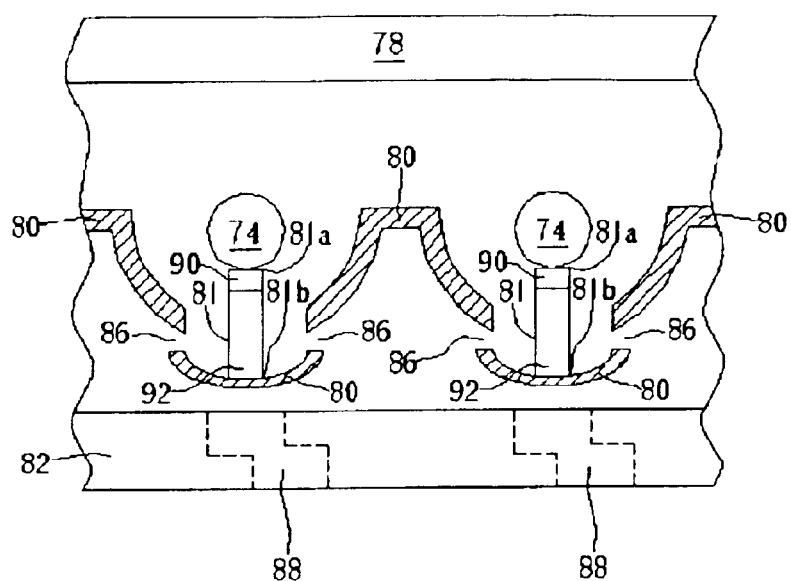
FIG. 6 is an enlarged schematic view of the column 81 in FIG. 5.

Please refer to FIG. 6 of an enlarged schematic view of the column 81. As shown in FIG. 6, the column 81 comprises a first end 81a and a second end 81b respectively contacted with the light source generator 74 and the reflecting sheet 80. The first end 81a comprises a rubber pad 90, and the second end 81b comprises a metal surface 92. In the preferred embodiment of the present invention, the metal surface 92 is a silver-plated surface with an excellent heat conductibility, and the rubber pad is employed not only to transfer the heat generated by the light source generator 74 during the operation of the back light module 70, but also to prevent the light source generator 74 from damage caused by vibration during transportation. Therefore, in the second embodiment of the present invention, the heat generated by the light source generator 74 during the operation of the back light module 70 is dissipated to a space under the reflecting sheet 80 conductively via the column 81 and the second vent hole, and is then further dissipated to the air outside the back light module 70 convectively via the opening 86 and the first vent hole 88.

In comparison with the back light module 10 in the prior art, the back light modules 40 and 70 revealed in the present invention respectively comprise the reflecting sheets 50 and 80 respectively with the opening 56 and the second vent hole 60, and the opening 86 and the second vent hole (not shown in figures corresponding to the second embodiment of the present invention). In addition, the back light modules 40 and 70 respectively comprise the arc-shaped structures and 50a and 80a to increase either the reflecting rate or the heat-dissipation area of the reflecting sheets 50 and 80. As the result, the heat generated by the light source generators 44 and 74 during the operation of the back light modules 40 and 70 can be rapidly dissipated to the air outside the back light modules 40 and 70. The heat transfer rate of the back light modules 40 and 70 is therefore improved. In addition, as revealed in the second embodiment of the present invention, the first and second ends 81a and 81b of the column 81 respectively comprise the rubber pad 90 and the metal surface 92 with excellent heat conductibility. Damage of the light source generator 74 caused by the vibration of the back light module 70 during transportation is thus prevented, and heat generated by the light source generator 74 can be dissipated, either conductively or convectively, to the air outside the back light module 70. Consequently, malfunctions caused by an abnormal temperature of the light source generator 74 due to the long-time operation of the back light module 70 are prevented, and product lives of either the back light module 70 or other relative components are increased as well.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A back light module disposed under a display panel comprising:
   at least one light source generator for generating a light source;
   a diffusing plate for scattering the light source to the display panel, the diffusing plate being disposed between the light source generator and the display panel;
   a prism disposed on a surface of the diffusing plate;
   a light guide plate (LGP) for scattering the light source to the diffusing plate, the light guide plate being disposed between the light source generator and the diffusing plate; and
   a reflecting sheet for reflecting the light source to the light guide plate; the reflecting sheet being disposed under the light source generator and comprising at least one opening for dissipating heat generated by the light source generator and a part of the reflecting sheet with a size substantially not less than the size of the opening being positioned at a different level from the opening.

2. The back light module of claim 1 wherein the back light module further comprises a housing disposed under the reflecting sheet to surround the reflecting sheet, and the housing comprises a plurality of first vent holes for assisting the dissipation of the heat generated by the light source generator.

3. The back light module of claim 1 wherein each of the openings is correspondingly disposed under the light source generator.

4. The back light module of claim 1 wherein the opening of the reflecting sheet has a slot shape corresponding to the shape of the light source generator.

5. The back light module of claim 1 wherein the light source generator is a cold cathode fluorescent lamp (CCFL).

6. The back light module of claim 5 wherein the cold cathode fluorescent lamps are arranged in parallel.

7. The back light module of claim 1 wherein the part of the reflecting sheet positioned at the different level from the opening is arc-shaped.

8. The back light module of claim 7 wherein the reflecting sheet comprises a plurality of second vent holes for assisting the dissipation of the heat generated by the light source generator.

9. A back light module disposed under a display panel comprising:
   at least one light source generator for generating a light source;
   a diffusing plate for scattering the light source to the display panel, the diffusing plate being disposed between the light source generator and the display panel;
   a prism disposed on a surface of the diffusing plate;
   a light guide plate (LGP) for scattering the light source to the diffusing plate, the light guide plate being disposed between the light source generator and the diffusing plate;
   a reflecting sheet for reflecting the light source to the light guide plate; the reflecting sheet being disposed under the light source generator and comprising at least one opening for dissipating heat generated by the light source generator;
   at least one column disposed between the light source generator and the reflecting sheet, the column comprising a first end contacted with the light source generator and a second end contacted with the reflecting sheet; and
   a housing disposed under the reflecting sheet to surround the reflecting sheet.

10. The back light module of claim 9 wherein the housing comprises a plurality of first vent holes for assisting the dissipation of the heat generated by the light source generator.

11. The back light module of claim 9 wherein each of the openings is correspondingly disposed under the light source generator.

12. The back light module of claim 10 wherein the first end comprises a rubber pad, and a surface of the second end is coated with a first metal.

13. The back light module of claim 12 wherein the first metal comprises silver.

14. The back light module of claim 12 wherein the heat generated by the light source generator is dissipated to the air outside the back light module either convectively via the opening and the first vent hole, or conductively via the column and the first vent hole.

15. The back light module of claim 9 wherein the opening of the reflecting sheet has a slot shape corresponding to the shape of the light source generator.

16. The back light module of claim 9 wherein the light source generator is a cold cathode fluorescent lamp.

17. The back light module of claim 16 wherein the cold cathode fluorescent lamps are arranged in parallel.

18. The back light module of claim 9 wherein the reflecting sheet comprises at least one arc-shaped structure to increase both the reflecting rate and the heat-dissipation area of the reflecting sheet.

19. The back light module of claim 18 wherein the reflecting sheet comprises a plurality of second vent holes for assisting the dissipation of the heat generated by the light source generator.

* * * * *